(12) United States Patent
Chuang et al.

(10) Patent No.: US 10,746,635 B2
(45) Date of Patent: Aug. 18, 2020

(54) METHOD AND APPARATUS FOR INSPECTING PROCESS SOLUTION, AND SAMPLE PREPARATION APPARATUS IN INSPECTION

(71) Applicant: TAIWAN SEMICONDUCTOR MANUFACTURING CO., LTD., Hsinchu (TW)

(72) Inventors: Tzu-Sou Chuang, Hsinchu (TW); Chi-Wen Kuo, Taipei (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 167 days.

(21) Appl. No.: 14/475,164

(22) Filed: Sep. 2, 2014

(65) Prior Publication Data

US 2016/0061695 A1    Mar. 3, 2016

(51) Int. Cl.
| | |
|---|---|
| *G01N 1/28* | (2006.01) |
| *G01Q 60/24* | (2010.01) |
| *G01N 27/02* | (2006.01) |
| *G01N 27/72* | (2006.01) |
| *G01Q 60/38* | (2010.01) |
| *G01Q 60/46* | (2010.01) |
| *G01Q 60/50* | (2010.01) |
| *G01Q 60/26* | (2010.01) |
| *G01Q 60/30* | (2010.01) |
| *G01N 21/65* | (2006.01) |
| *G01B 5/00* | (2006.01) |
| *G01N 21/84* | (2006.01) |

(52) U.S. Cl.
CPC .......... *G01N 1/2813* (2013.01); *G01N 21/65* (2013.01); *G01Q 60/24* (2013.01); *G01N 2021/8427* (2013.01); *G01Q 60/26* (2013.01); *G01Q 60/30* (2013.01); *G01Q 60/50* (2013.01)

(58) Field of Classification Search
CPC combination set(s) only.
See application file for complete search history.

(56) References Cited

U.S. PATENT DOCUMENTS

| | | | | |
|---|---|---|---|---|
| 2010/0062155 A1* | 3/2010 | Tajima | .................... | B05D 1/005 |
| | | | | 427/240 |
| 2011/0130494 A1* | 6/2011 | Penicaud | ............... | B82Y 30/00 |
| | | | | 524/104 |
| 2013/0048949 A1* | 2/2013 | Xia | ..................... | H01L 51/0537 |
| | | | | 257/29 |

OTHER PUBLICATIONS

Prater et al., Veeco TappingMode Imaging Applications and Technology, published 2004.*

(Continued)

*Primary Examiner* — Jennifer E Simmons
*Assistant Examiner* — Quang X Nguyen
(74) *Attorney, Agent, or Firm* — McDermott Will & Emery LLP (57) ABSTRACT

A method for inspecting a process solution is provided. In this method, a process solution is disposed on a surface of a substrate. A liquid of the process solution is removed to form an inspection sample by a spinning method. The surface of the substrate of the inspection sample is inspected by the surface inspection device to identify whether a residue of the process solution is left on the surface of the substrate after removing the liquid of the process solution. Further, an apparatus for inspecting a process solution and a sample preparation apparatus in inspection are also provided herein.

20 Claims, 8 Drawing Sheets

(56) References Cited

OTHER PUBLICATIONS

Kiefer et al. (Rotating Raman Sample Technique for Colored Crystal Powders; Resonance Raman Effect in Solid KMnO4, Applied Spectroscopy, vol. 25, No. 6, (1971), pp. 609-613; hereinafter Kiefer) (Year: 1971).*
Kim, et al., "Filtration efficiency of a fibrous filter for nanoparticles," Journal of Nanoparticle Research (2006) 8:215-221.
A. L. Weisenhorn, et al., "Atomically resolved images of bismuth films on mica with an atomic force microscope," Journal of Vacuum Science & Technology B9, 1333 (1991).
Models 3077/3077A Aerosol Neutralizers, Instruction Manual, P/N 1933077, Revision M, Sep. 2003.
H. Akkerman, "Large-Area Molecular Junctions," Zernike Institute Ph.D. Thesis Series, 2008-09.
D. L. VanderHart, et al., "Synthetic Mica: A Promising Substrate for Thin Film Studies by Solid State Proton NMR," Polymer Preprints 2008, 49(1), 739-740.

\* cited by examiner

METHOD AND APPARATUS FOR INSPECTING PROCESS SOLUTION, AND SAMPLE PREPARATION APPARATUS IN INSPECTION

BACKGROUND

Photolithography is a common process used in the fabrication of integrated circuits. During a photolithography process, a process solution, such as a photoresist material, is applied on a semiconductor wafer and is exposed with a predefined pattern to be transferred to the wafer. The characteristics and properties of the process solution may directly affect the quality of the photolithography patterning process and the performance of the thus-formed integrated circuits. Therefore, the quality control of the process solution is essential in the fabrication of integrated circuits.

It is complicated to prepare samples for inspecting the process solution. The sample preparation process of the process solution normally takes a long preparation time, which makes it impossible to inspect a particle or an impurity in the process solution at early stages of the photolithography. In addition, as the process solution has a particle or an impurity in a size less than 10 nm, detection of increasingly smaller defects becomes even more critical and difficult. Accordingly, improvements in the tool and method for inspecting a process solution continue to be needed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The singular forms "a," "an" and "the" used herein include plural referents unless the context clearly dictates otherwise. Therefore, reference to, for example, a dielectric layer includes embodiments having two or more such dielectric layers, unless the context clearly indicates otherwise. Reference throughout this specification to "one embodiment" means that a particular feature, structure, or characteristic described in connection with the embodiment is included in at least one embodiment of the present disclosure. Therefore, the appearances of the phrases "in one embodiment" or "in an embodiment" in various places throughout this specification are not necessarily all referring to the same embodiment. Further, the particular features, structures, or characteristics may be combined in any suitable manner in one or more embodiments. It should be appreciated that the following figures are not drawn to scale; rather, the figures are intended; rather, these figures are intended for illustration.

As aforementioned, when a process solution has a particle or an impurity in a size less than 10 nm, detection of increasingly smaller defects becomes even more critical but difficult for the SEM. In addition, such examining device requires a long sample preparation time, which make it impossible to conduct the examination in a production line. According to various embodiments of the present disclosure, a method and an apparatus for inspecting a process solution, and a sample preparation apparatus in inspection are provided.

Figure 1A:
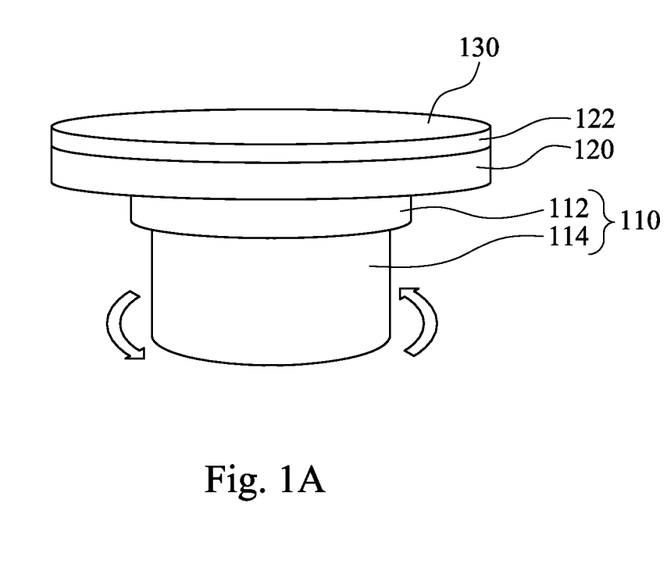
FIGS. 1A-1D are schematic views at various stages of inspecting a process solution, in accordance with some embodiments.

FIGS. 1A-1D are schematic views at various stages of inspecting a process solution, in accordance with some embodiments. In FIG. 1A, a process solution 130 is applied on a surface 122 of a substrate 120. According to various embodiments of the present disclosure, the process solution 130 applied on the surface 122 of the substrate 120 is a chemical mixture that includes a coating solution, a photoresist solution, a developing solution, an electroplating solution, a cleaning solution or an etching solution. According to various embodiments of the present disclosure, the substrate 120 includes a material made of mica, glass, highly oriented pyrolytic graphite (HOPG), semiconductor, metal or a combination thereof.

The process solution 130 is applied by a coating process on the surface 122 of the substrate 120. According to various embodiments of the present disclosure, the coating process is performed by a spinning device 110. In FIG. 1A, the substrate 120 is fixedly disposed on a spinning table 112 of the spinning device 110, and the process solution 130 is disposed on the substrate 120.

Figure 1B:
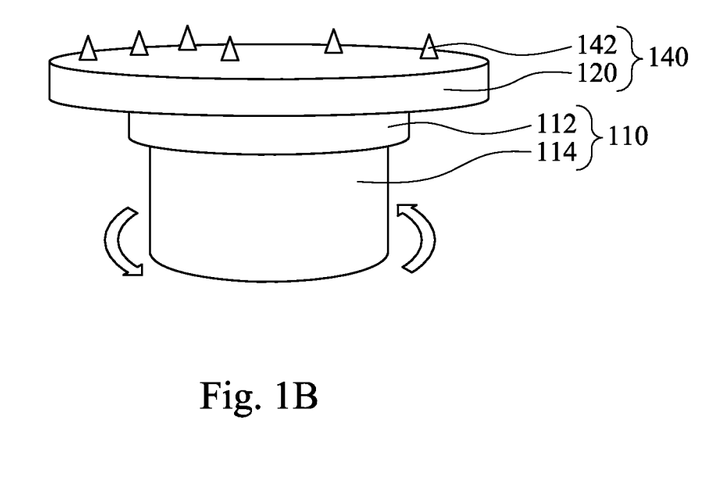

Referring to FIG. 1B, a liquid of the process solution 130 is removed to form an inspection sample 140 by a spinning process. According to various embodiments of the present disclosure, at least a portion of the liquid contained in the process solution 130 is removed to form an inspection sample 140 by a spinning process. According to various embodiments of the present disclosure, the spinning process is performed by spinning the substrate 120 to remove the liquid of the process solution 130. According to various embodiments of the present disclosure, the spinning process is performed by the spinning device 110.

Figure 1C:
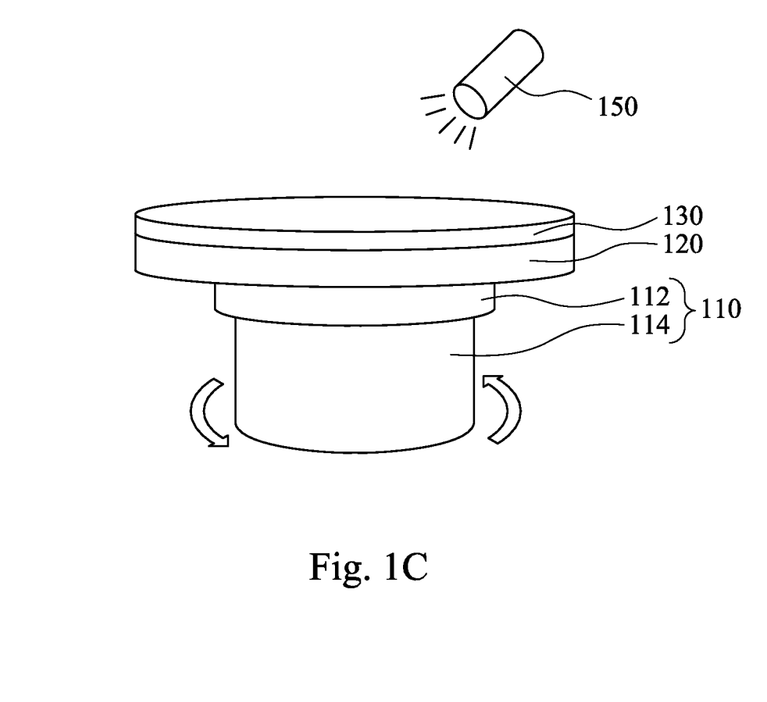

In various embodiments of the present disclosure, the liquid of the process solution may be removed by an evaporating process for evaporating the liquid of the process solution. In various embodiments of the present disclosure, the evaporating process is performed by an evaporating device. Referring to FIG. 1C, an evaporating device 150 is positioned over the substrate 120 and the process solution 130 to evaporate the liquid of the process solution 130. After evaporating the liquid of the process solution 130 by the evaporating device 150, the inspection sample 140 is formed as shown in FIG. 1B. According to various embodiments of the present disclosure, the evaporating device 150 includes an infra-red heating device or a microwave device.

In various embodiments of the present disclosure, the liquid of the process solution may be removed by spinning the substrate and evaporating the liquid of the process solution at the same time. In various embodiments of the present disclosure, the substrate is spun by the spinning device; and the liquid of the process solution is evaporated by the evaporating device. In FIG. 1C, the substrate 120 is fixedly disposed on a spinning table 112 of the spinning device 110, and the process solution 130 is disposed on the substrate 120. The liquid of the process solution 130 is removed by spinning the substrate 120 by the spinning device 110, and at the same time, the liquid of the process solution 130 is evaporated by the evaporating device 150 which is positioned over the process solution 130. After removing the liquid of the process solution 130 by the spinning device 110 and the evaporating device 150, the inspection sample 140 is formed as shown in FIG. 1B.

Figure 1D:
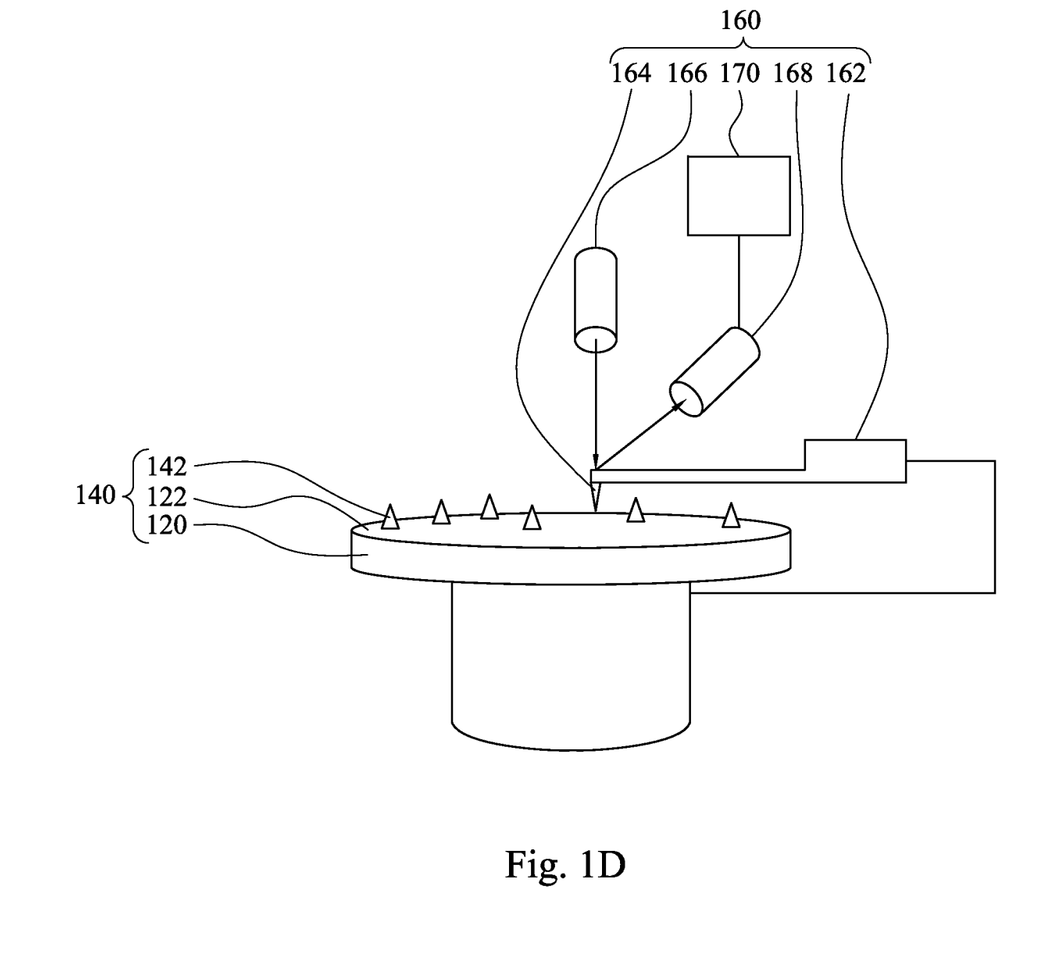

In FIG. 1D, the inspection sample 140 is moved to a surface inspection device 160, and then the surface 122 of the substrate 120 of the inspection sample 140 is inspected by the surface inspection device 160 to identify whether a residue 142 of the process solution is left on the surface 122 of the substrate 120 after removing the liquid of the process solution. According to various embodiments of the present disclosure, the residue 142 of the process solution includes a particle, an insoluble aggregate, an impurity or a combination thereof.

According to various embodiments of the present disclosure, the surface inspection device 160 includes an atomic force microscope (AFM) or a Raman scattering device.

In FIG. 1D, the surface inspection device 160 is an AFM for inspecting the surface of the substrate of the inspection sample 140. The surface inspection device 160 includes a cantilever 162, a probe needle 164, a light source 166 and a light sensor 168. The probe needle 164 is mounted on a tip of the cantilever 162, and is brought close to the surface 122 of the substrate 120. The light source 166 and the light sensor 168 are configured for detecting an optical change of the cantilever 162 from the light source 166.

If the residue 142 of the process solution is left on the surface 122 of the substrate 120 after removing the liquid of the process solution, the surface 122 of the substrate 120 of the inspection sample 140 is inspected by the surface inspection device 160 such as the AFM, and then the residue 142 left on the substrate 120 is identified. Because the detection limitation of an AFM is about 0.1 nm, a particle, an insoluble aggregate, an impurity or a combination thereof in a size less than 10 nm may be easily inspected by the AFM. Further, the sample preparation time of the AFM is quite short (about 1 min), such that the inspection method in accordance with various embodiments of the present disclosure is suitable to conduct the examination in the production line.

According to various embodiments of the present disclosure, a qualitative analysis of the residue of the process solution is further performed by a qualitative analysis device. In various embodiments of the present disclosure, the qualitative analysis of the residue of the process solution is performed by measuring a dielectric value, a magnetic force, a friction force, conductivity, a piezoelectric force or a combination thereof of the residue of the process solution. In various embodiments of the present disclosure, the qualitative analysis device is a capacitance microscope, a magnetic force microscope (MFM), a friction force microscope (FFM), an electrostatic force microscope (EFM), a piezoelectric force microscope (PFM), or a combination thereof. In various embodiments of the present disclosure, the qualitative analysis device is equipped with the surface inspection device.

Referring to FIG. 1D, a three-dimensional profile of the residue 142 is calculated by a calculating device 170 coupled to the surface inspection device 160. According to various embodiments of the present disclosure, the calculating device 170 includes a computer.

Figure 2:
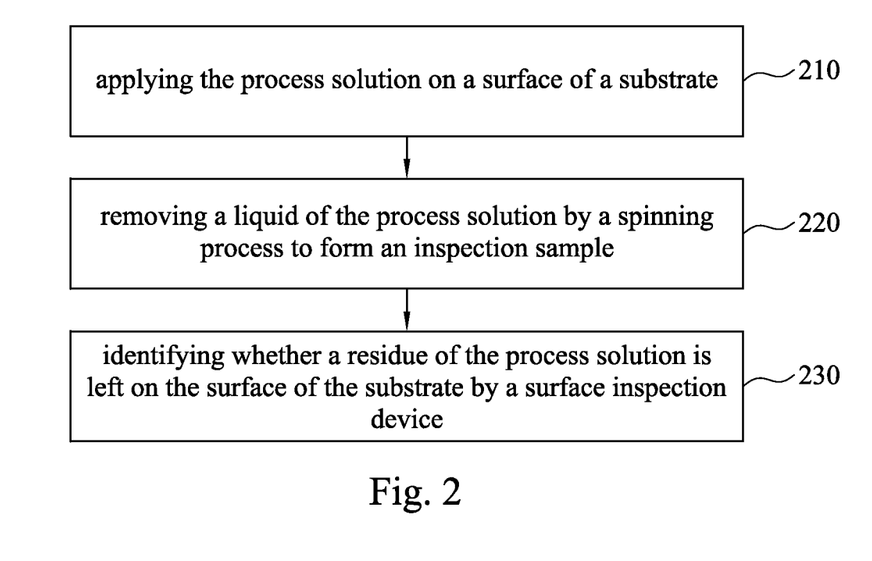
FIG. 2 is a flow chart illustrating methods for inspecting a process solution, in accordance with some embodiments.

FIG. 2 is a flow chart illustrating methods for inspecting a process solution, in accordance with some embodiments. The operations 210 to 230 are disclosed in association with the schematic views in FIGS. 1A-1D.

In the operation 210, the process solution 130 is applied on the surface 122 of the substrate 120. The process solution 130 is applied by the coating process to coat on the surface 122 of the substrate 120. According to various embodiments of the present disclosure, the coating process is performed by the spinning device 110.

According to various embodiments of the present disclosure, the process solution applied on the surface of the substrate is a chemical mixture that includes a coating solution, a photoresist solution, a developing solution, an electroplating solution, a cleaning solution or an etching solution. According to various embodiments of the present disclosure, the substrate includes a material made of mica, glass, highly oriented pyrolytic graphite (HOPG), semiconductor, metal or a combination thereof.

In the operation 220, the liquid of the process solution 130 is removed to form an inspection sample 140 by the spinning process. According to various embodiments of the present disclosure, at least a portion of the liquid contained in the process solution 130 is removed to form an inspection sample 140 by a spinning process. According to various embodiments of the present disclosure, the spinning process is performed by spinning the substrate 120 to remove the liquid of the process solution 130 on the substrate 120. According to various embodiments of the present disclosure, the spinning process is performed by a spinning device 110

In various embodiments of the present disclosure, the liquid of the process solution may be removed by the evaporating process for evaporating the liquid of the process solution by the evaporating device. Referring to FIG. 1C, the evaporating device 150 is positioned over the substrate 120 and the process solution 130 to evaporate the liquid of the process solution 130. After evaporating the liquid of the process solution 130 by the evaporating device 150, the inspection sample 140 is formed as shown in FIG. 1B. According to various embodiments of the present disclosure, the evaporating device 150 includes an infra-red heating device or a microwave device.

In the operation 230, the inspection sample 140 is inspected by the surface inspection device 160 to identify whether the residue 142 of the process solution is left on the surface 122 of the substrate 120 after removing the liquid of the process solution. According to various embodiments of the present disclosure, the evaporating device 150 includes an infra-red heating device or a microwave device.

Figure 3:
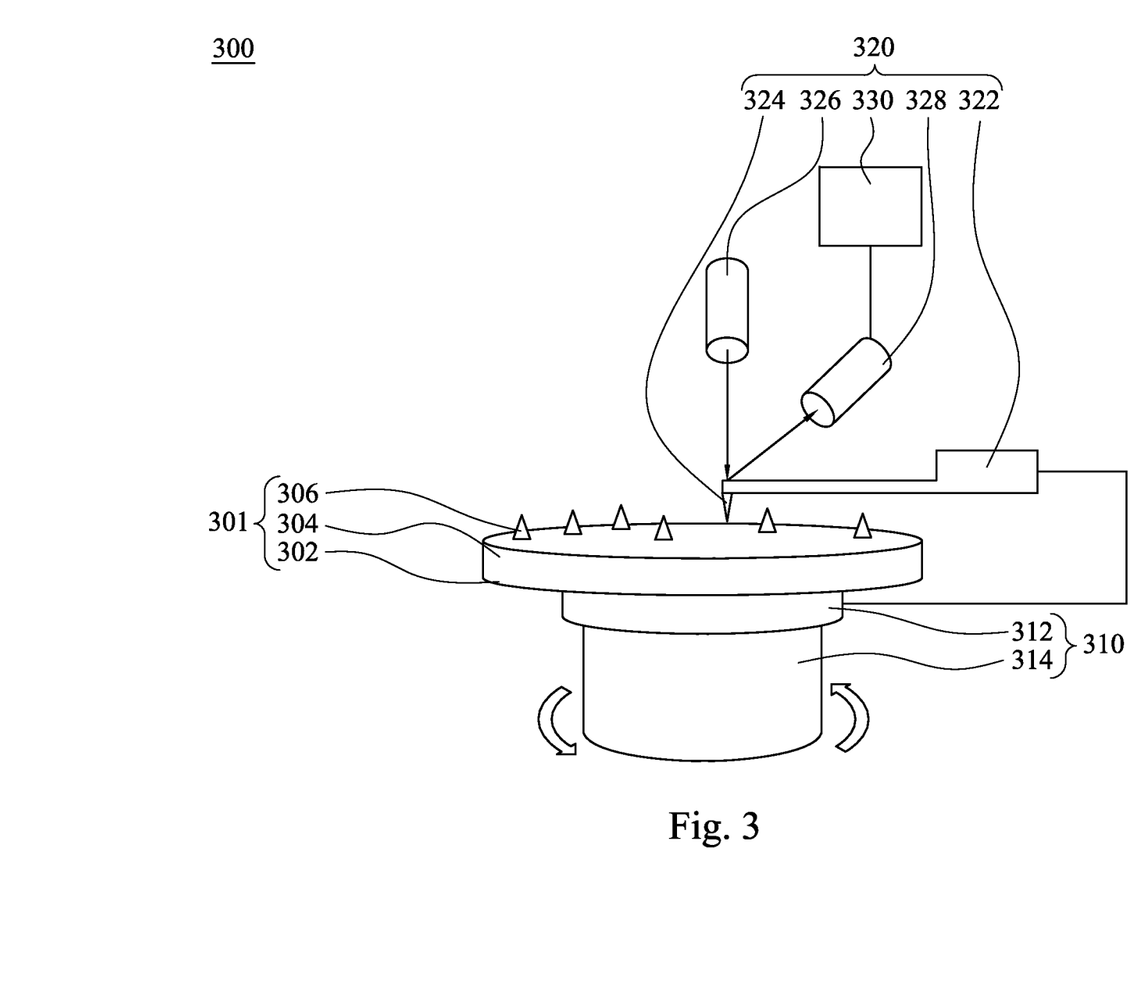
FIG. 3 is a schematic view of an apparatus for inspecting a process solution, in accordance with some embodiments.

FIG. 3 is a schematic view of an apparatus 300 for inspecting a process solution, in accordance with some embodiments. In FIG. 3, the apparatus 300 includes a spinning sample preparation device 310 and a surface inspection device 320.

The spinning sample preparation device 310 is configured to apply the process solution on a surface 304 of a substrate 302 and remove a liquid of the process solution. In various embodiments of the present disclosure, the spinning sample preparation device 310 includes a spin-coating device. In various embodiments of the present disclosure, the spinning sample preparation device 310 includes a spinning table 312 and a motor 314. The substrate 302 and the process solution are disposed on the spinning table 312 of the spinning sample preparation device 310.

In various embodiments of the present disclosure, the process solution applied on the surface of the substrate is a chemical mixture that includes a coating solution, a photoresist solution, a developing solution, an electroplating solution, a cleaning solution or an etching solution. According to various embodiments of the present disclosure, the substrate 302 includes a material made of mica, glass, highly oriented pyrolytic graphite (HOPG), semiconductor, metal or a combination thereof.

A liquid of the process solution is removed to form an inspection sample 301 by the spinning sample preparation device 310. According to various embodiments of the present disclosure, at least a portion of the liquid contained in the process solution is removed to form the inspection sample 301 by a spinning sample preparation device 310. According to various embodiments of the present disclosure, the liquid of the process solution is removed by spinning the substrate 302 by the spinning sample preparation device 310.

The surface inspection device 320 is coupled to the spinning sample preparation device 310. In various embodiments of the present disclosure, the surface inspection device 320 is for inspecting the surface 304 of the substrate 302 of the inspection sample 301 to identify whether a residue 306 of the process solution is left on the surface 304 of the substrate 302. In various embodiments of the present disclosure, the surface inspection device 320 is connected to the spinning sample preparation device 310. According to various embodiments of the present disclosure, the residue 306 of the process solution includes a particle, an insoluble aggregate, an impurity or a combination thereof. According to various embodiments of the present disclosure, the surface inspection device 320 includes an atomic force microscope or a Raman scattering device.

In FIG. 3, the surface inspection device 320 is an AFM for inspecting the surface 304 of the substrate 302 of the inspection sample 301. The surface inspection device 320 includes a cantilever 322, a probe needle 324, a light source 326 and a light sensor 328. The probe needle 324 is mounted on a tip of the cantilever 322, and is brought close to the surface 304 of the substrate 302. The light source 326 and the light sensor 328 are configured for detecting an optical change of the cantilever 322 from the light source 326.

If the residue 306 of the process solution is left on the surface 304 of the substrate 302 after removing the liquid of the process solution, the surface 304 of the substrate 302 of the inspection sample 301 is inspected by the surface inspection device 320 such as the AFM, and then the residue 306 left on the substrate 302 is identified. Because the detection limitation of an AFM is about 0.1 nm, a particle, an insoluble aggregate, an impurity or a combination thereof in a size less than 10 nm may be easily inspected by the AFM. Further, the sample preparation time of the AFM is quite short (about 1 min), such that the inspection method in accordance with various embodiments of the present disclosure is suitable to conduct the examination in the production line.

In FIG. 3, a three-dimensional profile of the residue 306 is calculated by a calculating device 330 connected to the surface inspection device 320. According to various embodiments of the present disclosure, the calculating device 330 includes a computer.

According to various embodiments of the present disclosure, the apparatus 300 further includes a qualitative analysis device equipped with the surface inspection device 320 for measuring a dielectric value, a magnetic force, a friction force, conductivity, a piezoelectric force or a combination thereof of the residue of the process solution. In various embodiments of the present disclosure, the qualitative analysis device includes a capacitance microscope, a magnetic force microscope (MFM), a friction force microscope (FFM), an electrostatic force microscope (EFM), a piezoelectric force microscope (PFM), or a combination thereof.

Figure 4:
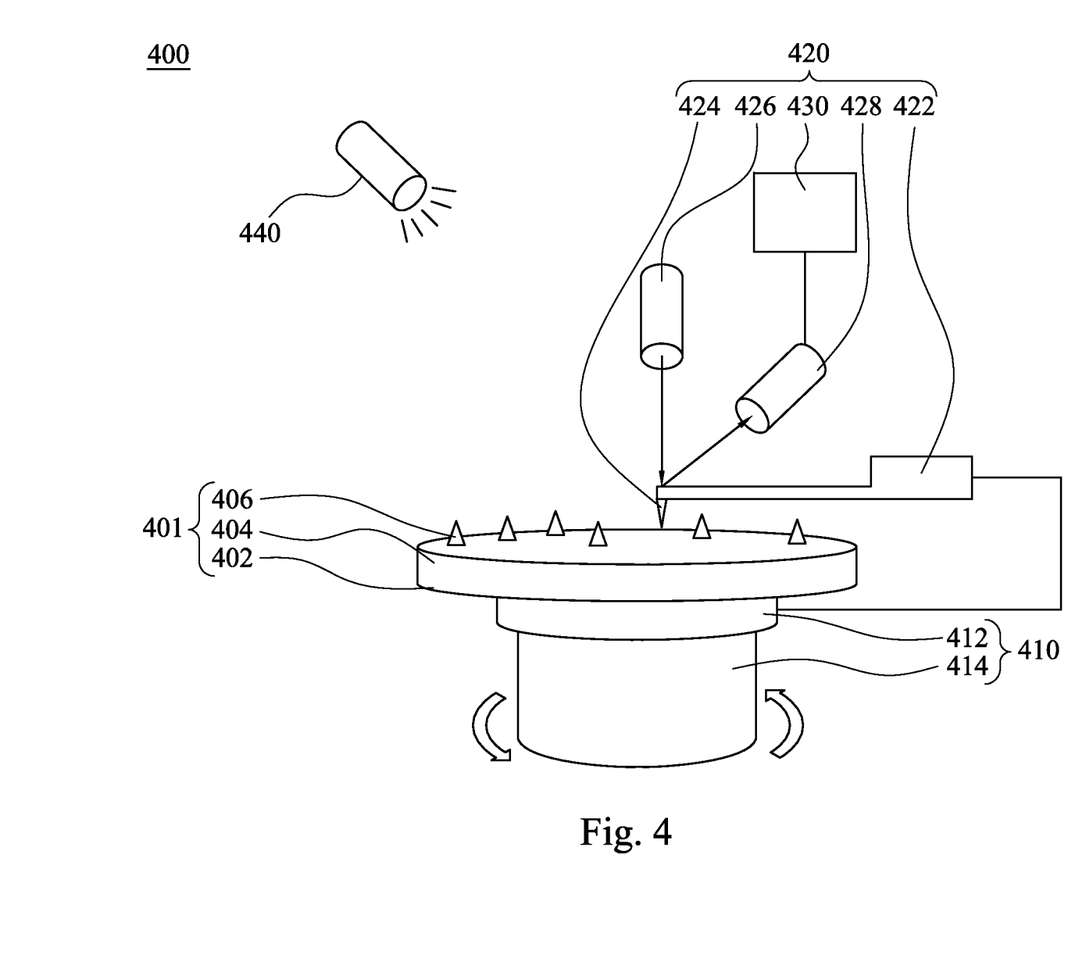
FIG. 4 is a schematic view of an apparatus for inspecting a process solution, in accordance with some embodiments.

FIG. 4 is a schematic view of an apparatus 400 for inspecting a process solution, in accordance with some embodiments. In FIG. 4, the apparatus 400 includes a spinning sample preparation device 410, a surface inspection device 420 and an evaporating device 440.

The spinning sample preparation device 410 is configured to apply the process solution on a surface 404 of a substrate 402 and remove a liquid of the process solution. In various embodiments of the present disclosure, the spinning sample preparation device 410 includes a spin-coating device. In various embodiments of the present disclosure, the spinning sample preparation device 410 includes a spinning table 412 and a motor 414. The substrate 402 and the process solution are disposed on the spinning table 412 of the spinning sample preparation device 410.

In various embodiments of the present disclosure, the process solution applied on the surface of the substrate is a chemical mixture that includes a coating solution, a photoresist solution, a developing solution, an electroplating solution, a cleaning solution or an etching solution. According to various embodiments of the present disclosure, the substrate 402 includes a material made of mica, glass, highly oriented pyrolytic graphite (HOPG), semiconductor, metal or a combination thereof.

A liquid of the process solution is removed to form an inspection sample 401 by the spinning sample preparation device 410. According to various embodiments of the present disclosure, at least a portion of the liquid contained in the process solution is removed to form the inspection sample 401 by a spinning sample preparation device 410. According to various embodiments of the present disclosure, the liquid of the process solution is removed by spinning the substrate 402 by the spinning sample preparation device 410.

Different from the apparatus 300, the apparatus 400 further includes the evaporating device 440 coupled to the spinning sample preparation device 410. In various embodiments of the present disclosure, the evaporating device 440 is configured to evaporate a liquid of the process solution. In various embodiments of the present disclosure, the evaporating device 440 is connected to the spinning sample preparation device 410.

In various embodiments of the present disclosure, the liquid of the process solution may be removed by the evaporating device 440. In FIG. 4, the evaporating device 440 is positioned over the substrate 402 and the process solution to evaporate the liquid of the process solution. After evaporating the liquid of the process solution by the evaporating device 440, the inspection sample 401 is formed. According to various embodiments of the present disclosure, the evaporating device 440 includes a heating device, and the heating device includes an infra-red heating device.

In various embodiments of the present disclosure, the liquid of the process solution may be removed by spinning the substrate and evaporating the liquid of the process solution at the same time. In various embodiments of the present disclosure, the substrate is spun by the spinning sample preparation device; and the liquid of the process solution is evaporated by the evaporating device. In FIG. 4, the substrate 402 is fixedly disposed on a spinning table 412 of the spinning sample preparation device 410, and the process solution is disposed on the substrate 402. The liquid of the process solution is removed by spinning the substrate 402 by the spinning sample preparation device 410, and at the same time, the liquid of the process solution is evaporated by the evaporating device 440 which is positioned over the process solution. After removing the liquid of the process solution by the spinning sample preparation device 410 and the evaporating device 440, the inspection sample 401 is formed.

The surface inspection device 420 is coupled to the spinning sample preparation device 410. In various embodiments of the present disclosure, the surface inspection device 420 is for inspecting the surface 404 of the substrate 402 of the inspection sample 401 to identify whether a residue 406 of the process solution is left on the surface 404 of the substrate 402. In various embodiments of the present disclosure, the surface inspection device 420 is connected to the spinning sample preparation device 410. According to various embodiments of the present disclosure, the residue 406 of the process solution includes a particle, an insoluble aggregate, an impurity or a combination thereof. According to various embodiments of the present disclosure, the surface inspection device 420 includes an atomic force microscope or a Raman scattering device.

In FIG. 4, the surface inspection device 420 is an AFM for inspecting the surface 404 of the substrate 402 of the inspection sample 401. The surface inspection device 420 includes a cantilever 422, a probe needle 424, a light source 426 and a light sensor 428. The probe needle 424 is mounted on a tip of the cantilever 422, and is brought close to the surface 404 of the substrate 402. The light source 426 and the light sensor 428 are configured for detecting an optical change of the cantilever 422 from the light source 426.

If the residue 406 of the process solution is left on the surface 404 of the substrate 402 after removing the liquid of the process solution, the surface 404 of the substrate 402 of the inspection sample 401 is inspected by the surface inspection device 420 such as the AFM, and then the residue 406 left on the substrate 402 is identified. Because the detection limitation of an AFM is about 0.1 nm, a particle, an insoluble aggregate, an impurity or a combination thereof in a size less than 10 nm may be easily inspected by the AFM. Further, the sample preparation time of the AFM is quite short (about 1 min), such that the inspection method in accordance with various embodiments of the present disclosure is suitable to conduct the examination in the production line.

In FIG. 4, a three-dimensional profile of the residue 406 is calculated by a calculating device 430 connected to the surface inspection device 420. According to various embodiments of the present disclosure, the calculating device 430 includes a computer.

According to various embodiments of the present disclosure, the apparatus 300 further includes a qualitative analysis device equipped with the surface inspection device 420 for measuring a dielectric value, a magnetic force, a friction force, conductivity, a piezoelectric force or a combination thereof of the residue of the process solution. In various embodiments of the present disclosure, the qualitative analysis device includes a capacitance microscope, a magnetic force microscope (MFM), a friction force microscope (FFM), an electrostatic force microscope (EFM), a piezoelectric force microscope (PFM), or a combination thereof.

Figure 5:
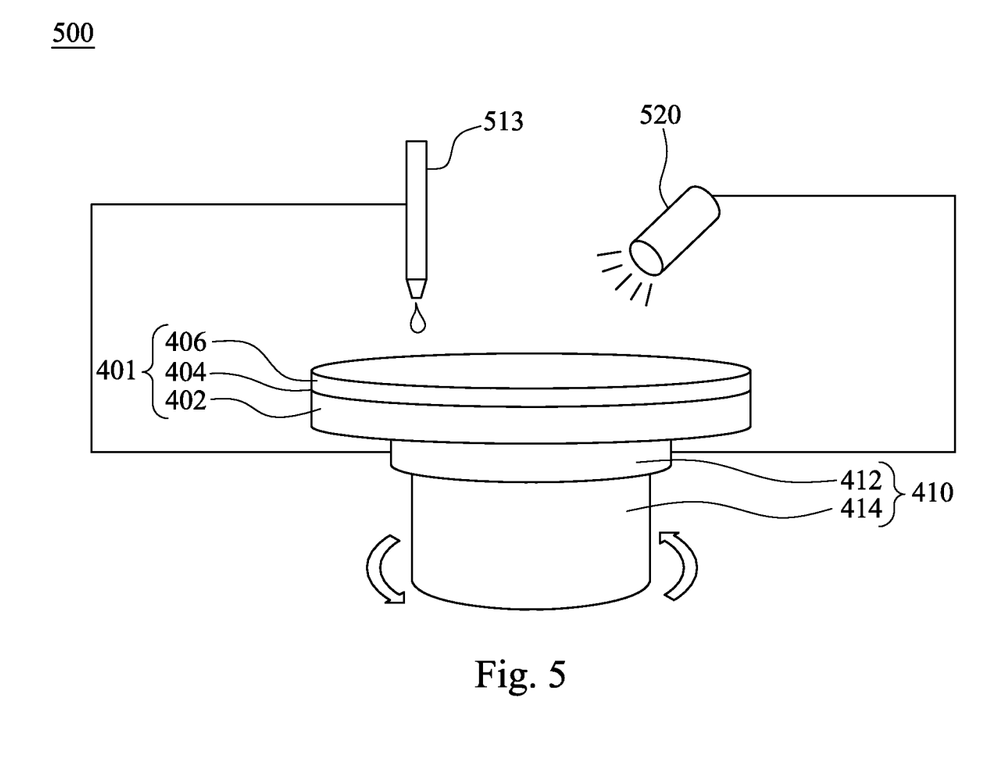
FIG. 5 is a schematic view of a sample preparation apparatus in inspection, in accordance with some embodiments.

FIG. 5 is a schematic view of a sample preparation apparatus 500 in inspection, in accordance with some embodiments. In FIG. 5, the sample preparation apparatus 500 includes a spinning device 510 and an evaporating device 520.

The spinning device 510 includes a spinning table 512, a solution supplying unit 513 and a motor 514. The spinning table 512 is for holding a substrate 502. The solution supplying unit 513 is coupled to the spinning table 512 and configured to apply a process solution 506 on a surface 504 of the substrate 502. The motor 514 is connected to the spinning table 512 and configured to spin the spinning table 512 and remove a liquid of the process solution 506.

In various embodiments of the present disclosure, the spinning device 510 includes a spin-coating device. In FIG. 5, the substrate 502 is fixedly disposed on a spinning table 512 of the spinning device 510, and the process solution 506 is disposed on the substrate 502.

In various embodiments of the present disclosure, the process solution 506 applied on the surface 504 of the substrate 502 is a chemical mixture that includes a coating solution, a photoresist solution, a developing solution, an electroplating solution, a cleaning solution or an etching solution. According to various embodiments of the present disclosure, the substrate 502 includes a material made of mica, glass, highly oriented pyrolytic graphite (HOPG), semiconductor, metal or a combination thereof.

In various embodiments of the present disclosure, a liquid of the process solution 506 may be removed by the spinning device 510 to form an inspection sample. According to various embodiments of the present disclosure, the liquid of the process solution 506 is removed by spinning the substrate 502 by the spinning device 510.

In FIG. 5, the evaporating device 520 is coupled to the spinning device 510. In various embodiments of the present disclosure, the evaporating device 520 is connected to the spinning device 510. In various embodiments of the present disclosure, the evaporating device 520 is configured to evaporate a liquid of the process solution 506.

In various embodiments of the present disclosure, the liquid of the process solution 506 may be removed by the evaporating device 520. In FIG. 5, the evaporating device 520 is positioned over the substrate 502 and the process solution 506 to evaporate the liquid of the process solution 506. After evaporating the liquid of the process solution by the evaporating device 520, the inspection sample is formed. According to various embodiments of the present disclosure, the evaporating device 520 includes a heating device, and the heating device includes an infra-red heating device.

In some embodiments of the present disclosure, the present disclosure disclosed a method for inspecting a process solution. In this method, a process solution is disposed on a surface of a substrate. A liquid of the process solution is removed to form an inspection sample by a spinning process. The surface of the substrate of the inspection sample is inspected by the surface inspection device to identify whether a residue of the process solution is left on the surface of the substrate after removing the liquid of the process solution.

In some embodiments of the present disclosure, the present disclosure disclosed an apparatus for inspecting a process solution. The apparatus includes a spinning sample preparation device and a surface inspection device. The spinning sample preparation device is configured to apply the process solution on a surface of a substrate and remove a liquid of the process solution. The surface inspection device is coupled to the spinning sample preparation device and configured to inspect the surface of the substrate of the inspection sample to identify whether a residue of the process solution is left on the surface of the substrate. In some embodiments of the present disclosure, the apparatus further includes the evaporating device coupled to the spinning sample preparation device, and the evaporating device is configured to evaporate a liquid of the process solution.

In some embodiments of the present disclosure, a sample preparation apparatus in inspection includes a spinning device and an evaporating device. The spinning device is configured to apply the process solution on a surface of a substrate and remove a liquid of the process solution. The evaporating device is coupled to the spinning device and configured to evaporate a liquid of the process solution.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method for inspecting a process solution, the method comprising:

applying, on a surface of a substrate on a spinning sample preparation device, a process solution selected from a group consisting of a photoresist solution, a developing solution, an electroplating solution, a cleaning solution, and an etching solution;

removing a liquid of the process solution from the surface of the substrate by a spinning process such that a residue of the process solution remains on the surface of the substrate;

detecting a change of a cantilever of a surface inspection device vertically above the surface of the substrate on the spinning sample preparation device; and identifying the residue of the process solution left on the surface of the substrate as a defect by the surface inspection device.

2. The method of claim 1, wherein applying the process solution on the surface of the substrate is coating the process solution on the surface of the substrate by a coating process.

3. The method of claim 1, wherein removing the liquid of the process solution by the spinning process is removing the liquid of the process solution by spinning the substrate.

4. The method of claim 1, wherein removing the liquid of the process solution further comprises performing an evaporating process for evaporating the liquid of the process solution by an evaporating device.

5. The method of claim 1, wherein identifying by the surface inspection device is identifying by an atomic force microscope.

6. The method of claim 5, further comprising performing a qualitative analysis of the residue of the process solution by a qualitative analysis device.

7. The method of claim 6, wherein performing a qualitative analysis of the residue of the process solution comprises measuring a dielectric value, a magnetic force, a friction force, conductivity, a piezoelectric force or a combination thereof of the residue of the process solution, by a qualitative analysis device equipped with the surface inspection device.

8. The method of claim 1, wherein the substrate comprises a material made of mica, glass, highly oriented pyrolytic graphite (HOPG), semiconductor, metal or a combination thereof.

9. The method of claim 1, further comprising calculating a three-dimensional profile of the residue by a calculating device coupled to the surface inspection device.

10. An apparatus for inspecting a process solution on a substrate, comprising:

a spinning sample preparation device configured to apply the process solution on a surface of the substrate and to remove a liquid of the process solution;

a surface inspection device coupled to the spinning sample preparation device and configured to identify a residue left on the surface of the substrate on the spinning sample preparation device by bringing a probe needle of the surface inspection device toward the surface of the substrate on the spinning sample preparation device; and a qualitative analysis device equipped with the surface inspection device and configured to perform a qualitative analysis on the residue.

11. The apparatus of claim 10, wherein the spinning sample preparation device comprises a spin-coating device.

12. The apparatus of claim 10, wherein the surface inspection device comprises an atomic force microscope.

13. The apparatus of claim 10, wherein the qualitative analysis device is further configured to measure a dielectric value, a magnetic force, a friction force, a conductivity, a piezoelectric force or a combination thereof of the residue and wherein the qualitative analysis device comprises a capacitance microscope, a magnetic force microscope (MFM), a friction force microscope (FFM), an electrostatic force microscope (EFM), a piezoelectric force microscope (PFM), or a combination thereof.

14. The apparatus of claim 10, further comprising an evaporating device coupled to the spinning sample preparation device and configured to evaporate a liquid of the process solution.

15. The apparatus of claim 14, wherein the evaporating device comprises an infra-red heating device or a microwave device.

16. The apparatus of claim 10, wherein the spinning sample preparation device includes a spinning table and the surface inspection device is directed toward the spinning table.

17. An apparatus for inspection of a process solution on a substrate, comprising:
- a spinning device configured to remove a liquid from the process solution and comprising:
  - a spinning table configured to hold the substrate;
  - a solution supplying unit coupled to the spinning table and configured to apply the process solution on a surface of the substrate; and
  - a motor connected to the spinning table and configured to spin the spinning table;
- an evaporating device coupled to the spinning device, positioned over the substrate, and configured to evaporate a liquid of the process solution;
- a surface inspection device coupled to the spinning device and configured to identify a residue left on the surface of the substrate on the spinning table by bringing a probe needle of the surface inspection device toward the surface of the substrate on the spinning sample preparation device; and
- a calculating device coupled to the surface inspection device and configured to calculate a profile of the residue.

18. The apparatus of claim 17, wherein the spinning device comprises a spin-coating device configured to coat the process solution on the surface of the substrate.

19. The apparatus of claim 17, wherein the evaporating device comprises an infra-red heating device or a microwave device.

20. The apparatus of claim 17, wherein the surface inspection device is directed toward the spinning table.

* * * * *